United States Patent
Yamada

(10) Patent No.: US 10,791,248 B2
(45) Date of Patent: Sep. 29, 2020

(54) COLOR SEPARATION PROCESSING METHOD, PRINTING METHOD, AND COLOR SEPARATION PROCESSING APPARATUS

(71) Applicant: HOSOKAWA YOKO CO., LTD., Tokyo (JP)

(72) Inventor: Naoyuki Yamada, Tokyo (JP)

(73) Assignee: HOSOKAWA YOKO CO., LTD., Tokyo (JP)

( * ) Notice: Subject to any disclaimer, the term of this patent is extended or adjusted under 35 U.S.C. 154(b) by 15 days.

(21) Appl. No.: 15/704,678

(22) Filed: Sep. 14, 2017

(65) Prior Publication Data
US 2018/0084154 A1     Mar. 22, 2018

(30) Foreign Application Priority Data

Sep. 16, 2016 (JP) ................. 2016-181605

(51) Int. Cl.
| | |
|---|---|
| H04N 1/60 | (2006.01) |
| H04N 1/54 | (2006.01) |
| H04N 1/405 | (2006.01) |
| H04N 1/58 | (2006.01) |
| B41M 1/10 | (2006.01) |

(52) U.S. Cl.
CPC .......... *H04N 1/6055* (2013.01); *H04N 1/405* (2013.01); *H04N 1/54* (2013.01); *H04N 1/603* (2013.01); *H04N 1/6058* (2013.01); *B41M 1/10* (2013.01); *H04N 1/58* (2013.01)

(58) Field of Classification Search
None
See application file for complete search history.

(56) References Cited

U.S. PATENT DOCUMENTS

| | | | |
|---|---|---|---|
| 4,774,567 A | 9/1988 | Stansfield | |
| 6,924,908 B1 * | 8/2005 | Kimia | H04N 1/6033 358/1.9 |
| 7,692,831 B2 | 4/2010 | Nishikawa | |
| 9,344,605 B2 * | 5/2016 | Li | G06F 3/12 |
| 9,948,830 B2 | 4/2018 | Inamura et al. | |
| 2003/0234942 A1 | 12/2003 | Jeran | |

(Continued)

FOREIGN PATENT DOCUMENTS

| | | |
|---|---|---|
| EP | 0260891 A1 | 3/1988 |
| JP | 07-081205 | 3/1995 |

(Continued)

OTHER PUBLICATIONS

Office Action dated Jul. 22, 2020 for the corresponding Japanese Patent Application No. 2016-181605 and its English machine translation.

*Primary Examiner* — Barbara D Reinier
(74) *Attorney, Agent, or Firm* — Rankin, Hill & Clark LLP

(57) ABSTRACT

A color separation processing method includes: preparing one or a plurality of tables including a first color and one or a plurality of second colors obtained by mixing the first color with one or a plurality of added colors; selecting the table including the first color in accordance with a color sample and selecting the second color corresponding to the color sample from the selected table; and obtaining color separation values of the first color and the added color constituting the selected second color.

19 Claims, 6 Drawing Sheets

(56) References Cited

U.S. PATENT DOCUMENTS

| | | | |
|---|---|---|---|
| 2005/0083558 A1* | 4/2005 | Kim | H04N 1/60 |
| | | | 358/523 |
| 2006/0139668 A1 | 6/2006 | Nishikawa | |
| 2007/0002343 A1 | 1/2007 | Butterfield | |
| 2012/0200633 A1* | 8/2012 | Aoyama | B41J 2/155 |
| | | | 347/20 |
| 2014/0168712 A1 | 6/2014 | Smith | |
| 2016/0156811 A1* | 6/2016 | Iwamoto | H04N 1/622 |
| | | | 358/1.9 |
| 2016/0360072 A1 | 12/2016 | Inamura et al. | |
| 2019/0098178 A1* | 3/2019 | Tanaka | H04N 1/6033 |

FOREIGN PATENT DOCUMENTS

| | | |
|---|---|---|
| JP | 2006-173800 A | 6/2006 |
| JP | 2016-105539 A | 6/2016 |
| JP | 2016-225940 A | 12/2016 |

\* cited by examiner

SPECIFIED COLOR TABLE

COLOR SEPARATION PROCESSING METHOD, PRINTING METHOD, AND COLOR SEPARATION PROCESSING APPARATUS

CROSS-REFERENCE TO RELATED APPLICATION

This application claims priority from Japanese Patent Application No. 2016-181605 filed with the Japan Patent Office on Sep. 16, 2016, the entire content of which is hereby incorporated by reference.

BACKGROUND

1. Technical Field

The present disclosure relates to a color separation processing method, a printing method, and a color separation processing apparatus.

2. Description of the Related Art

As a method of reproducing a color demanded by a client (hereinafter, referred to as "specified color") in a printing technique using "cylinders" such as gravure printing, the following methods are known.

Method A: A spot color corresponding to a specified color is reproduced by toning an ink of a color prepared by a maker (hereinafter, referred to as "standard color").

Method B: Equivalent printed matter is obtained by using only an ink of a process color without using an ink of a spot color (for example, see JP-A-07-81205).

SUMMARY

A color separation processing method includes: preparing one or a plurality of tables including a first color and one or a plurality of second colors obtained by mixing the first color with one or a plurality of added colors; selecting the table including the first color in accordance with a color sample and selecting the second color corresponding to the color sample from the selected table; and obtaining color separation values of the first color and the added color constituting the selected second color.

DESCRIPTION OF THE EMBODIMENTS

Figure 1:
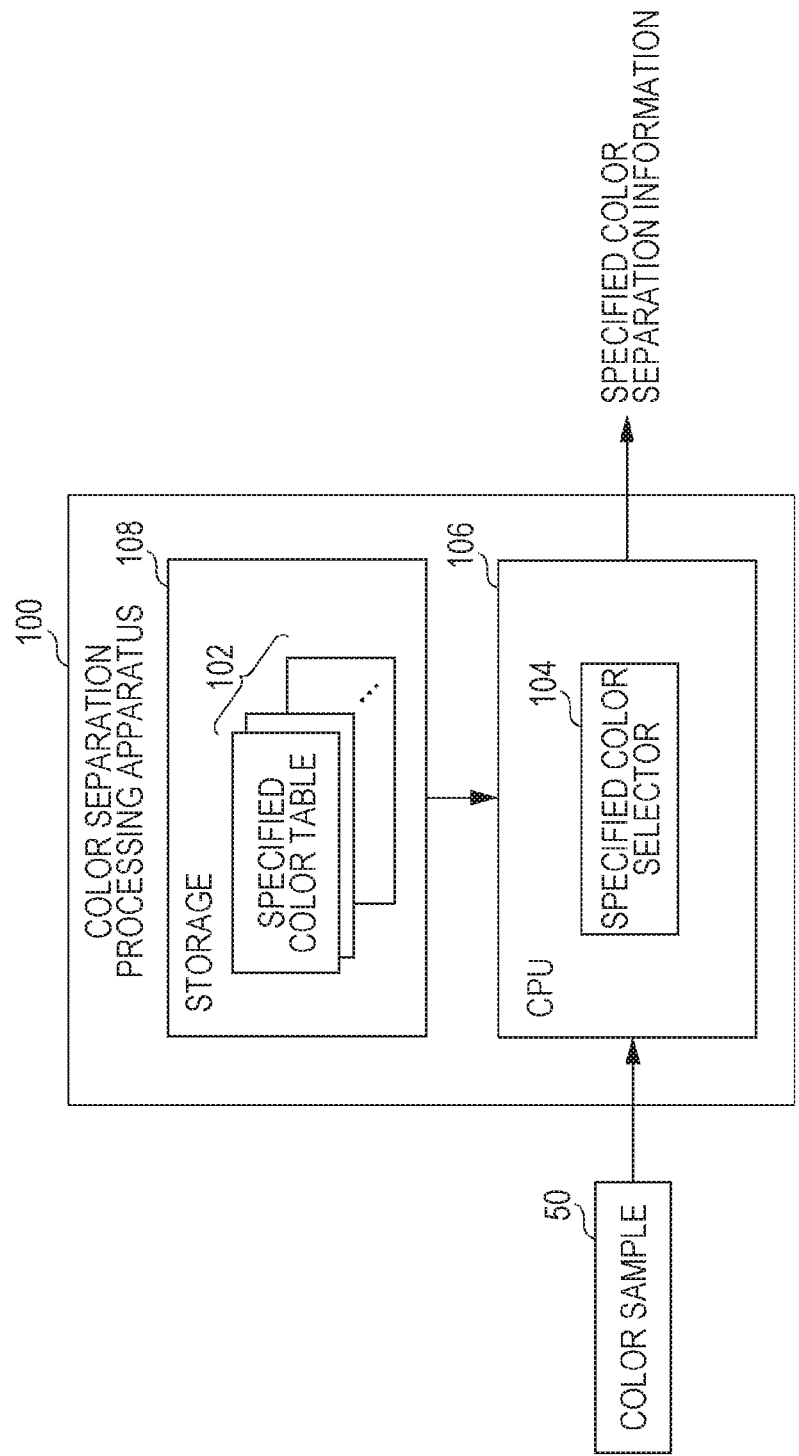
FIG. 1 shows a color separation processing apparatus according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the method A, in many cases, it is difficult to divert an excessive residual ink into reproduction of colors other than a specific specified color after printing. Therefore, various spot color inks occupy a stock space, regardless of whether the inks are discarded or stocked. Therefore, efficiency of stock management is reduced.

In the method B, a printing shift cannot be allowed in some cases depending on a combination of process color inks to be mixed with each other.

In view of this, an object of the present disclosure is to reduce a defective product caused by a printing shift while reducing an excessive residual ink in a case where a spot color corresponding to a specified color is reproduced in a printing technique using "cylinders".

In this disclosure, the following aspects will be described.

A color separation processing method according to a first aspect includes: preparing one or a plurality of tables including a first color and one or a plurality of second colors obtained by mixing the first color with one or a plurality of added colors; selecting the table including the first color in accordance with a color sample and selecting the second color corresponding to the color sample from the selected table; and obtaining color separation values of the first color and the added color constituting the selected second color.

The color separation processing method according to a second aspect is the color separation processing method according to the first aspect, wherein the first color is a color obtained by toning inks of two or more colors.

The color separation processing method according to a third aspect is the color separation processing method according to the first aspect, wherein the second color is a color obtained by mixing an ink of the first color with an ink of the added color.

The color separation processing method according to a fourth aspect is the color separation processing method according to the first aspect, wherein the first color is first deep blue and the second color is second deep blue obtained by mixing the first deep blue with the added color.

The color separation processing method according to a fifth aspect is the color separation processing method according to the fourth aspect, wherein the first deep blue is a color obtained by toning at least one or more standard colors and the added color includes one or more process colors.

The color separation processing method according to a sixth aspect is the color separation processing method according to the fourth aspect, wherein the first deep blue is obtained from one or a plurality of inks of process colors, one or a plurality of inks of standard colors, one or a plurality of spot color inks, one or a plurality of spot inks, or combinations of those inks.

The color separation processing method according to a seventh aspect is the color separation processing method according to the fourth aspect, wherein the second deep blue is a color obtained by mixing a predetermined dot percent of an ink of one or more process colors serving as the added color with an ink of the first deep blue; and obtaining the color separation values includes obtaining dot percents of the first deep blue and the added color constituting the second deep blue.

The color separation processing method according to an eighth aspect is the color separation processing method according to the first aspect, wherein the first color is first brown and the second color is second brown obtained by mixing the first brown with the added color.

The color separation processing method according to a ninth aspect is the color separation processing method according to the eighth aspect, wherein the first brown is a color obtained by toning at least one or more standard colors and the added color includes one or more process colors.

The color separation processing method according to a tenth aspect is the color separation processing method according to the eighth aspect, wherein the first brown is obtained from one or a plurality of inks of process colors, one or a plurality of inks of standard colors, one or a plurality of spot color inks, one or a plurality of spot inks, or combinations of those inks.

The color separation processing method according to an eleventh aspect is the color separation processing method according to the eighth aspect, wherein the second brown is a color obtained by mixing a predetermined dot percent of an ink of one or more process colors serving as the added color with an ink of the first brown and obtaining the color separation values includes obtaining dot percents of the first brown and the added color constituting the second brown.

A printing method according to a twelfth aspect includes mixing an ink of the first color with an ink of the added color based on the color separation values of the first color and the added color constituting the second color, the color separation values being obtained by the color separation processing method according to any one of the first to eleventh aspects.

A color separation processing apparatus according to a thirteenth aspect includes: a storage configured to store a table including a first color and one or a plurality of second colors obtained by mixing the first color with one or a plurality of added colors; and a specified color selector configured to select the table including the first color in accordance with a color sample, select the second color corresponding to the color sample from the selected table, and obtain color separation values of the first color and the added color constituting the selected second color.

According to an aspect of the present disclosure, it is possible to reduce a defective product caused by a printing shift while reducing an excessive residual ink in a case where a spot color corresponding to a specified color is reproduced in a printing technique using "cylinders".

An embodiment for implementing a technique of the present disclosure will be described with reference to the drawings. The embodiment described below is merely an example. An embodiment to which the technique of the present disclosure is applied is not limited to the following embodiment.

Note that, in all the drawings for describing the embodiment, the same reference sign is used for members having the same function, and repeated description thereof will be omitted.

<Color Separation Processing Apparatus>

FIG. 1 shows a color separation processing apparatus according to an embodiment. A color separation processing apparatus 100 outputs a spot color used to reproduce a color sample indicated by a client (orderer of printing) or the like, a process color to be mixed with the spot color, and a color separation value of the process color. Herein, the process color means four colors such as cyan (C), magenta (M), yellow (Y), and key (K) which are used in color printing. The process color may further include lightcyan and lightmagenta in addition to those four colors. That is, the process color may be four or more colors. Further, the spot color means a color blended in advance in order to express a color that is difficult to reproduce by using the process colors in printing.

The color separation processing apparatus 100 includes a central processing unit (CPU) 106 and a storage 108. The storage 108 stores a program (color separation processing program) for causing the CPU 106 to function as the color separation processing apparatus 100, and a specified color table 102 described below. The CPU 106 carries out color separation with respect to a color sample indicated by an orderer or the like of printing by executing the program stored on the storage 108. With this color separation, the CPU 106 obtains information on a spot color and a process color to be mixed with the spot color.

The specified color table 102 is a table showing a versatile spot color (hereinafter, referred to as "common color") used in a case where a specific specified color configured in advance is reproduced and specified colors obtained by mixing a process color with the common color. One or a plurality of specified color tables 102 is prepared in accordance with the number of common colors. In the color separation processing apparatus 100 according to this embodiment, the common color is deep blue. Deep blue is obtained as follows. Two or more process colors are selected from among four or more process colors such as cyan, magenta, yellow, and key. The common color (deep blue) is obtained by toning the selected two or more process colors. Note that the common color may be obtained by toning at least one or more standard colors. Herein, the standard color may be one or a plurality of colors among all colors prepared by an ink maker. The spot color is all colors other than the process colors among the standard colors. The common color (first color) may be obtained by toning inks of two or more colors.

The color separation processing apparatus 100 functions as a specified color selector 104 by causing the CPU 106 to execute the program stored on the storage 108. In a case where a color sample is specified by a person who orders printing, the specified color selector 104 selects a specified color corresponding to the color sample from among the specified colors included in the specified color table 102. Then, the specified color selector 104 outputs a common color constituting the selected specified color (included in the selected specified color), a color separation value of the common color, a process color to be mixed with the common color, and a color separation value of the process color. Hereinafter, information indicating the common color, the color separation value of the common color, the process color to be mixed with the common color, and the color separation value of the process color will be referred to as "specified color separation information".

<Specified Color Table>

Figure 2:
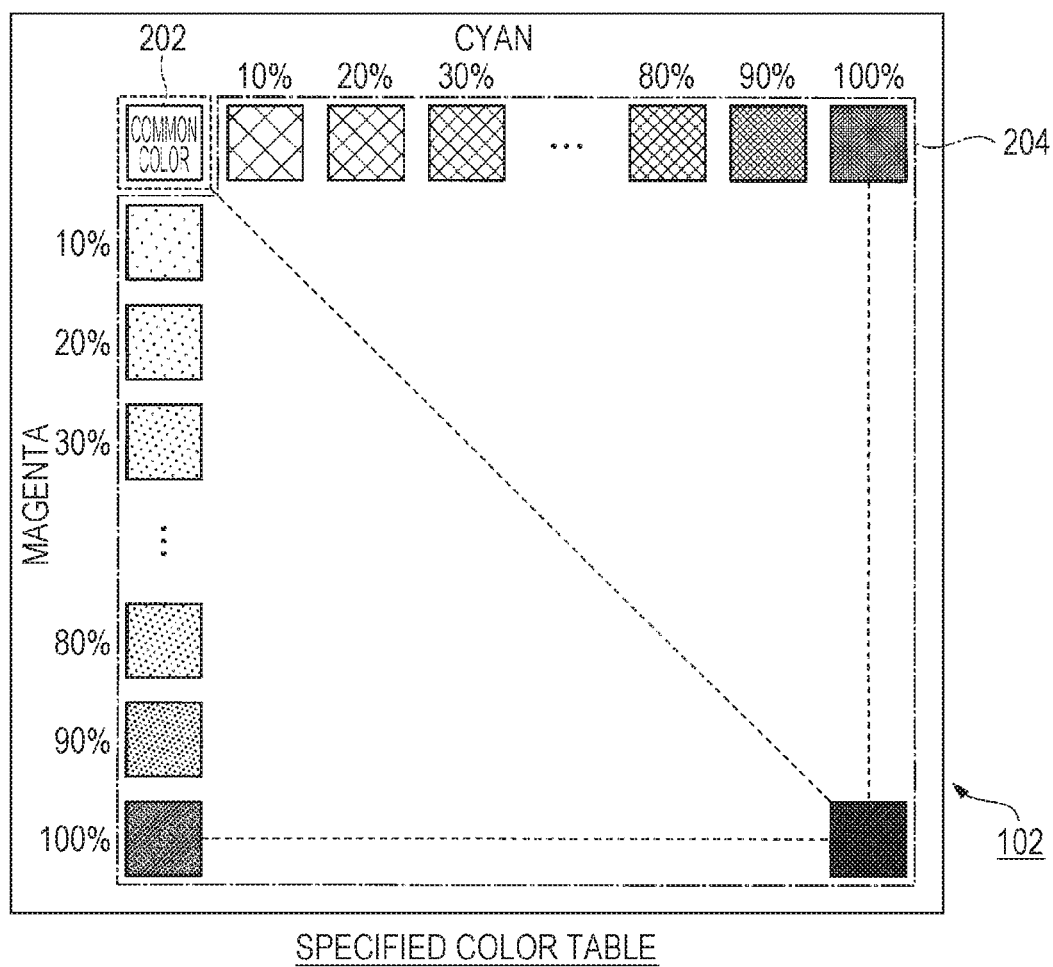
FIG. 2 shows an example of a specified color table.

FIG. 2 shows an example of the specified color table 102. The specified color table 102 includes a first area 202 in which a common color is shown and a second area 204 in which one or a plurality of specified colors is shown.

Herein, there will be described a case where deep blue is applied as an example of the common color and, in order to further prepare an example of the specified color, both or one of cyan and magenta among the process colors is mixed with the common color. In other words, deep blue (hereinafter, referred to as "first deep blue") is prepared as the common color. Furthermore, deep blue (hereinafter, referred to as "second deep blue") is prepared by mixing the first deep blue with both or one of cyan and magenta. The process colors to be mixed with the common color are not limited to cyan and magenta and may be other process colors. Further, in order to prepare the specified color, a standard color may be mixed with the common color, instead of or in addition to the process colors.

Note that the first deep blue is an example of the first color. The process color and/or standard color to be mixed with the common color (first color) are examples of an added color. The second deep blue is an example of a second color. The second color may be a color obtained by mixing an ink of the common color (first color) with an ink of the process color and/or standard color (added color).

The common color is indicated by using a CIELAB (CIE1976L*a*b*display) space defined by Commission Internationale de l'Eclairage (CIE). Therefore, a measurement value obtained by measuring a color of the common color can be indicated as (L*, a*, b*). In a case where the common color is expressed by using the CIELAB space and the measurement value of the common color is indicated as (L1, a1, b1), a range of the first deep blue is L1=15 to 52, a1=−20 to 35, and b1=−70 to −50 and is more preferably L1=25 to 45, a1=−20 to 22, and b1=−70 to −60.

The second area 204 is prepared by showing the second deep blue in one or both of a lateral direction and a longitudinal direction with respect to the first area 202. In the example shown in FIG. 2, a plurality of second deep blue colors is shown in both the lateral direction and the longitudinal direction with respect to the first area 202. The second deep blue colors shown in the second area 204 prepared in the lateral direction with respect to the first area 202 are prepared by mixing the first deep blue with a predetermined dot percent (for example, 10% to 100%, at intervals of 10%) of cyan. Further, the second deep blue colors shown in the second area 204 prepared in the longitudinal direction with respect to the first area 202 are prepared by mixing a predetermined dot percent (for example, 10% to 100%, at intervals of 10%) of magenta with the first deep blue shown in the first area or with the second deep blue colors shown in the second area prepared in the lateral direction with respect to the first area.

<Operation of Color Separation Processing Apparatus>

Regarding operation of the color separation processing apparatus 100, processing for preparing the specified color table 102 and processing for selecting a specified color from the specified color table will be separately described.

Figure 3:
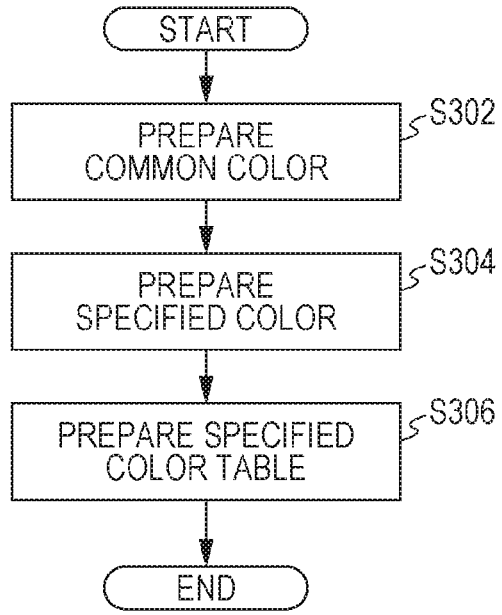
FIG. 3 is a flowchart showing an example of processing for preparing a specified color table.

FIG. 3 is a flowchart showing processing for preparing a specified color table.

In step S302, for example, a user prepares a common color. The user selects two or more process colors from among four or more process colors. Furthermore, the user prepares a common color by blending the selected two or more process colors. For example, the user prepares first deep blue by blending the two or more process colors selected from among the four or more process colors. The user may prepare a plurality of first deep blue colors.

In step S304, for example, the user prepares a specified color. The user prepares the specified color by mixing one or more process colors with the common color. For example, the user prepares second deep blue by mixing both or one of cyan and magenta with the first deep blue.

In step S306, for example, the user prepares the specified color table 102. The user prepares the specified color table 102 including the first area 202 in which the common color is shown and the second area 204 in which one or a plurality of specified colors is shown. In a case where a plurality of common colors is prepared, a plurality of specified color tables is prepared for each common color.

It is assumed that a plurality of color samples of deep blue colors whose color attributes such as hue, brightness, and saturation are different from each other is indicated by a plurality of orderers. In this case, each of the deep blue colors (specified colors) indicated by the plurality of orderers can be reproduced by blending two or more standard colors. However, when an ink of a specified color is toned in accordance with the color sample of deep blue indicated by each orderer, it is difficult to divert an excessive residual ink after printing as an ink for deep blue other than the deep blue indicated by each orderer. Therefore, various spot color inks occupy a stock space, regardless of whether the inks are discarded or stocked. Therefore, efficiency of stock management is reduced.

In this embodiment, there is prepared a common color that is mixed with different process colors to constitute deep blue colors (specified colors) indicated by a plurality of orderers. Even in a case where attributes of the deep blue colors of color samples from respective orderers are different from each other, it is possible to reproduce the deep blue colors (specified colors) of the color samples indicated by the respective orderers by preparing a common color and mixing a process color with an ink of the common color. The ink of the common color can be diverted into reproduction of the deep blue colors (specified colors) indicated by the plurality of orderers, and therefore the ink is not easily wasted.

Figure 4:
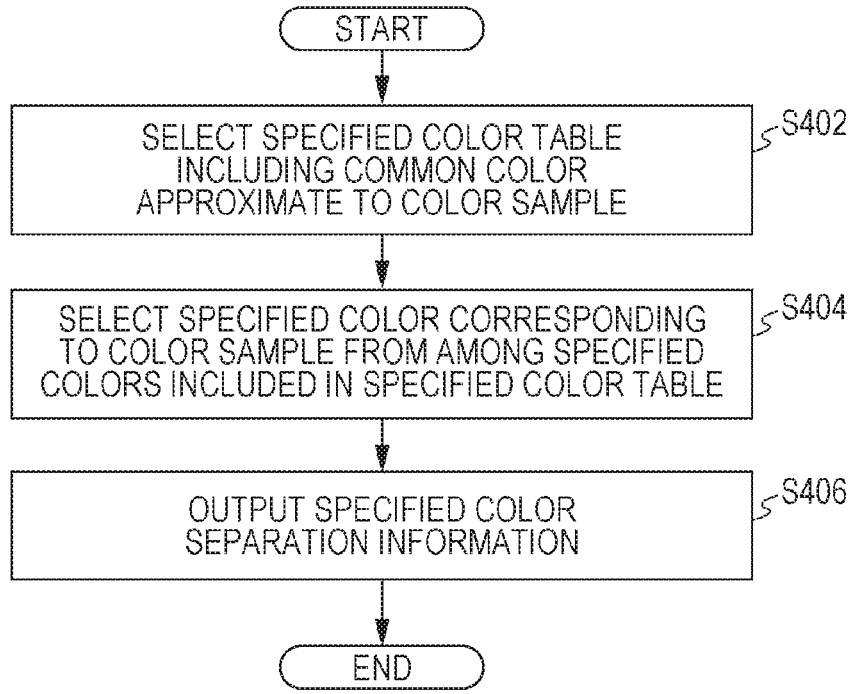
FIG. 4 is a flowchart showing an example of operation of a color separation processing apparatus.

FIG. 4 shows processing for selecting a specified color from the specified color table 102. In step S402, in order to reproduce a color sample 50 indicated by a person who orders printing, the specified color selector 104 selects a specified color table including a common color approximate to the color sample 50 (common color (first color) in accordance with the color sample 50) based on common colors included in a respective plurality of specified color tables. For example, the specified color selector 104 may select a plurality of specified color tables including a common color (first color) closest to the color sample from among a plurality of specified color tables 102. For example, the specified color selector 104 may select a specified color table by using the CIELAB space. In this case, the specified color selector 104 calculates a color difference ΔE based on a measurement value (L1, a1, b1) obtained by measuring a color of the common color included in each of the plurality of specified color tables and a measurement value (L2, a2, b2) obtained by measuring a color of the color sample 50. Then, the specified color selector 104 selects a specified color table including a common color that minimizes the color difference ΔE. In this case, the color difference ΔE is calculated as follows, for example.

$$\text{Color difference } \Delta E = \sqrt{((L1-L2)^2+(a1-a2)^2+(b1-b2)^2)}$$

Further, the specified color selector 104 may acquire a specified color table including a common color approximate to the selected color sample 50 based on the common colors included in the respective plurality of specified color tables in response to an instruction from the user (who may be an orderer) who has visually recognized the color sample and the plurality of specified color tables.

In step S404, the specified color selector 104 selects a specified color corresponding to the color sample from among specified colors included in the specified color table selected in step S402. That is, the specified color selector 104 selects a specified color (second color) corresponding to the color sample from the selected specified color table. For example, the specified color selector 104 may select a specified color (second color) closest to the color sample from the selected specified color table. For example, the specified color selector 104 may select a specified color by using the CIELAB space. In this case, the specified color selector 104 calculates a color difference ΔE based on a measurement value (L3, a3, b3) obtained by measuring a color of a specified color included in the selected specified color table and the measurement value (L2, a2, b2) obtained by measuring the color of the color sample 50. Then, the specified color selector 104 selects a specified color that minimizes the color difference ΔE. In this case, the color difference ΔE is calculated as follows, for example.

$$\text{Color difference } \Delta E = \sqrt{((L2-L3)^2 + (a2-a3)^2 + (b2-b3)^2)}$$

Further, the specified color selector 104 may acquire, from the user who has visually recognized the color sample and the plurality of specified colors, information for selecting a specified color corresponding to the color sample 50 from among the specified colors included in the specified color table selected in step S402.

In step S406, the specified color selector 104 outputs specified color separation information of the specified color selected in step S404. For example, the specified color selector 104 outputs information indicating the common color constituting the specified color and a color separation value of the common color such as dot percent and information indicating a process color to be mixed with the common color and a color separation value of the process color such as dot percent. That is, the specified color selector 104 obtains color separation values of the common color (first color) and the process color (added color) constituting the selected specified color (second color). At this time, the specified color selector 104 may obtain dot percents of the common color (first color) and the process color (added color) constituting the selected specified color (second color).

In this way, the CPU 106 can carry out color separation with respect to the color sample indicated by the orderer of printing and can obtain information on a common color (and a color separation value thereof) and a process color (and a color separation value thereof).

<Printing Process>

Figure 5:
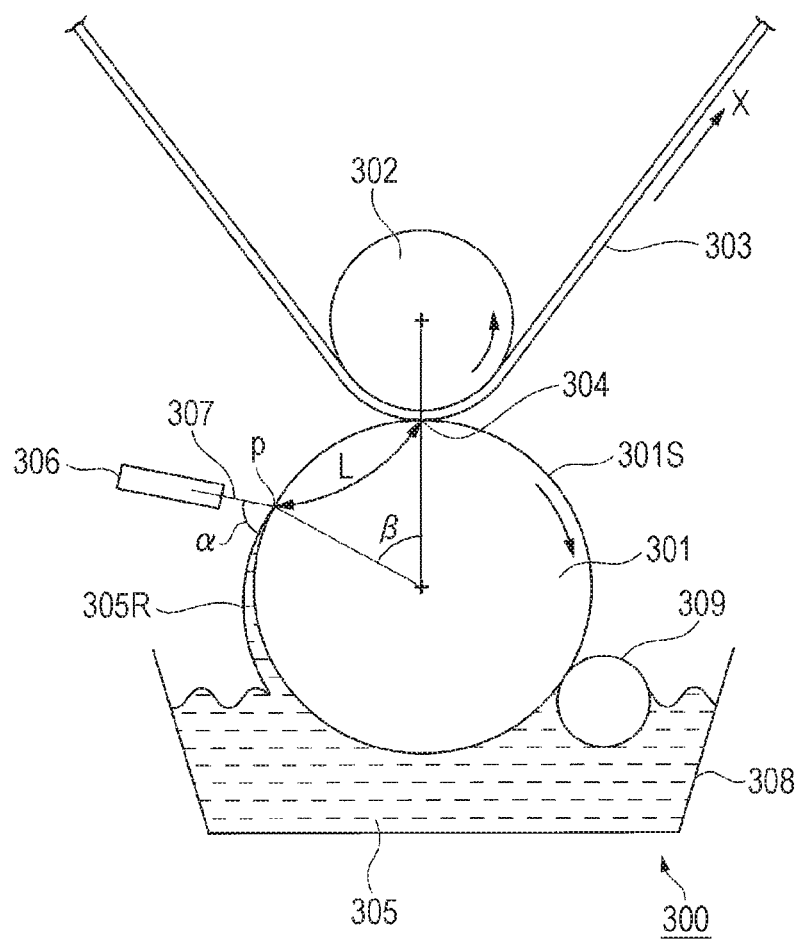
FIG. 5 shows a printing apparatus according to an embodiment.

FIG. 5 shows a printing apparatus according to an embodiment of the present disclosure. Herein, a case of gravure printing will be described as an example. Note that a technique of this embodiment is not limited to gravure printing and can be applied to an arbitrary printing technique using "cylinders".

A printing apparatus 300 includes a plate cylinder 301, an impression cylinder 302, a doctor device 306, a doctor blade 307, an ink pan 308, and a furnisher roller 309. The plate cylinder 301 and the impression cylinder 302 are arranged to face each other. A printing base material 303, such as a plastic film, paper, and aluminum foil, is inserted between contact surfaces of both cylinders. Printing is carried out by a method of transferring an ink in a cell on a cylinder surface 301s of the plate cylinder 301 to the printing base material 303 with pressure (printing pressure) between the plate cylinder 301 and the impression cylinder 302. In FIG. 5, the printing base material 303 moves in a direction of an arrow X. The ink pan 308 is filled with a fluid printing ink 305. The plate cylinder 301 is rotated so that a part of a lower surface thereof is soaked with the printing ink 305.

The furnisher roller 309 is used for the purpose of favorably causing the printing ink 305 to adhere to the plate cylinder 301. Further, an ink circulation stirring device may be coupled to the ink pan 308. With this configuration, it is possible to uniformly maintain an ink viscosity and an ink amount.

The printing ink 305 is printing inks of a common color and a process color constituting a specified color selected to reproduce the color sample 50. Generally, the printing apparatus (printing unit) 300 is prepared for each color. Then, overprinting is carried out by printing the common color and the process color in this order.

Regarding a size of the plate cylinder 301, for example, a circumference is 450 mm to 900 mm, and a printing width is about 500 mm to 1500 mm. The printing ink 305 rises together with the cylinder surface 301s of the plate cylinder 301 in accordance with rotation of the plate cylinder 301. A surplus ink is scraped off the cylinder surface 301s by the doctor blade 307 of the doctor device 306, and necessary ink remains in the cell. The ink in the cell is transferred to the printing base material 303 between the plate cylinder 301 and the impression cylinder 302.

Next, the printing base material 303 passes through the inside of a drying machine. As a result, a solvent component in the ink other than a pigment component and a resin composition component is volatilized. Then, the printing base material 303 moves to the next unit, and subsequent printing (printing using an ink of another color) is carried out. The solvent component is volatilized not only in the drying machine but also while the ink is adhering to the cylinder surface 301s, that is, after the cylinder surface 301s passes through the doctor blade 307 but before the cylinder surface 301s reaches the printing base material 303.

In a printing plate (cylinder surface 301s) fabricated by a corrosion technique, which is used in gravure printing, intensity of printing is expressed by cells having a substantially constant opening area and different depths. Further, cells having different opening areas and depths are formed in a printing plate (engraving plate) engraved by an electronic engraving machine. Not only in a case where the engraving plate is used but also in a case of a halftone gravure, both an opening area and a depth of a cell are changed for each cell. The opening area of the cell is changed in accordance with the number of lines per inch. For example, in packaging material printing, the number of lines to be used is about 150 lines to 250 lines.

The impression cylinder 302 is a roller including an iron core and rubber wound around the iron core. A surface of the impression cylinder 302 is smoothly polished. The impression cylinder 302 is configured so that pressure (printing pressure) on the plate cylinder 301 can be adjusted by a hydraulic cylinder or the like. Constant printing pressure is applied to the plate cylinder 301 during printing. Hardness and material of the rubber of the impression cylinder 302 are appropriately selected in accordance with a printing material and the like. The doctor device 306 is a mechanism for supporting the doctor blade 307 so that the doctor blade 307 can be replaced. The doctor device 306 is configured so that a contact angle (doctor angle) a between the doctor blade 307 and the cylinder surface and contact pressure (doctor pressure) on the cylinder surface can be adjusted. Further, the doctor device 306 has a structure in which the doctor device 306 itself moves in accordance with printing and the doctor blade 307 moves from side to side on the cylinder surface in parallel within a constant range.

By carrying out printing by using the printing apparatus 300 in accordance with specified color separation information, an ink of a common color and an ink of a process color are mixed, and therefore it is possible to carry out, with respect to the printing base material 303, printing using deep blue of a color sample indicated by a person who orders printing.

In particular, in a case where the specified color is deep blue, a printing shift can be made inconspicuous by mixing a common color with a process color.

In the printing apparatus 300 that carries out gravure printing, when a pattern such as a letter is printed by mixing one or both of two or more standard colors and process colors, misregister (printing shift) occurs in some cases due to a structure of a machine or an influence of, for example, expansion and contraction of a printing base material. Further, a part in which misregister is conspicuous is removed as a defective product.

As a method for making misregister inconspicuous, it is possible to use a method that is generally referred to as "trapping processing". The "trapping processing" is processing in which a pattern of one of two colors (two or more colors in some cases) to be mixed is reduced to be slightly smaller than a pattern of another color in advance. A difference in the size between both the patterns is referred to as "trapping". With this processing, even in a case where a printing shift occurs, a protruding part is reduced, and the printing shift is made inconspicuous. A size of the "trapping" is arbitrarily changed in accordance with, for example, a combination of a size and color of a figure (pattern).

However, in some cases, it is difficult to make misregister inconspicuous only by performing the "trapping processing" depending on a combination of colors. Specifically, there is a case where a color having a high depth, such as a "deep blue" group or a "brown" group, is reproduced by mixing a plurality of process colors. For example, in a case where a letter of "deep blue" is printed without using a spot color, desired "deep blue" is reproduced by mixing "cyan" with "magenta". In this case, depths of both "cyan" and "magenta" are increased. Therefore, when misregister occurs, the misregister is conspicuous, regardless of which color protrudes from the other color. Further, cyan and magenta are blue and red, so to speak. Therefore, a combination thereof is a combination of colors (opposite colors) which positions opposite each other in a color circle. Therefore, misregister is easily conspicuous, unlike a case where cyan and yellow are mixed and a case where magenta and yellow are mixed. In particular, in a case where a shift is large, a pattern such as a double line of blue and red is seen. In some cases, it is possible to further increase "trapping" in order to make the misregister inconspicuous. However, in a case where "trapping" is large, a contour itself of a single color formed in a printed pattern is conspicuous. Further, in a case where a pattern to be reproduced is a small letter or figure, a size of the "trapping" is also naturally limited.

In view of this, in this embodiment, in a case where a pattern of a "deep blue" group is printed, a "deep blue" color, which is a versatile color among "deep blue" colors that are frequently used, is set as a "common color". A color difference between the common color and "deep blue" that is a specified color of each commodity is adjusted by appropriately mixing the "common color" and one or both of a process color and a standard color. In this case, the "common color" having a high depth is used as a base. As a result, it is possible to reduce a depth of the process color and/or standard color to be mixed. Therefore, even if "trapping" is not provided, misregister is inconspicuous.

Furthermore, in this embodiment, it is possible to carry out printing in which misregister is further inconspicuous by providing the "trapping". Further, the "common color" having a high depth and the process color (and/or standard color) having a low depth are mixed, and therefore the "trapping" itself is also inconspicuous.

Specifically, a pattern of a printing plate used when an ink of the process color is transferred to a printing base material is reduced to be smaller than a pattern of a printing plate used when an ink of the common color is transferred to the printing base material. It is thus possible to further make a printing shift inconspicuous.

Figure 6A:
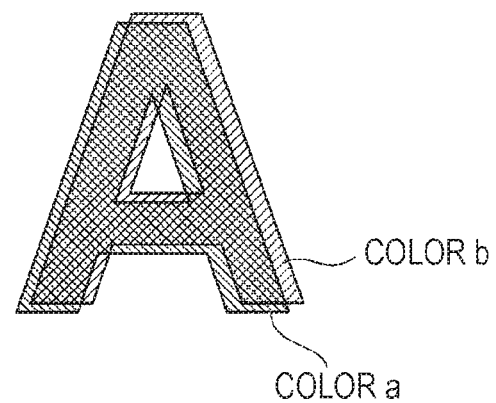
FIGS. 6A to 6C show (first) comparison results of a printing shift.
Figure 6B:
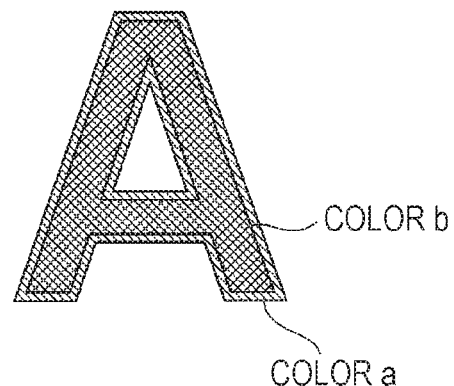
Figure 6C:
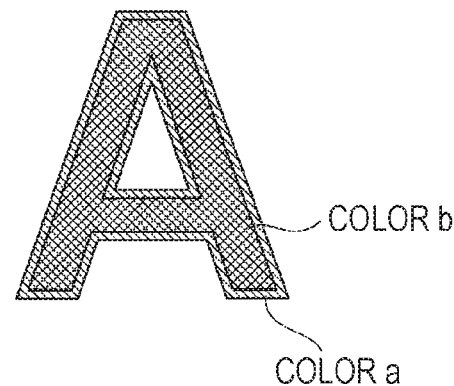

FIGS. 6A and 6B show examples of a printing result of deep blue prepared by mixing process colors in accordance with a conventional printing method. FIG. 6C shows an example of a printing result of deep blue prepared in accordance with this embodiment. In FIGS. 6A and 6B, a "color a" is cyan, and a "color b" is magenta.

According to FIG. 6A, when a printing shift between the "color a" and the "color b" occurs, a part in which the "color a" and the "color b" are overlapped looks deep blue, whereas a part of only the "color a" looks blurred blue. Furthermore, a part of only the "color b" looks blurred pink.

In the example shown in FIG. 6B, in order to make a printing shift inconspicuous, a figure of one color is slightly reduced. That is, so-called "trapping" is provided. The "color a" and the "color b" in FIG. 6B have a relationship of opposite colors and both are deep colors. Therefore, even in a case where "trapping" is provided in one color, the other color is made conspicuous. Specifically, it appears that a border of the "color a" is provided in the example shown in FIG. 6B, which does not look good.

In the example shown in FIG. 6C, the "color a" is set to be "deep blue" serving as a common color and the "color b" is set to be "cyan", "magenta", or both thereof. According to FIG. 6C, both the "deep blue" serving as the common color and the specified color have high depths and have close hues. Therefore, it is possible to reduce a depth of the "color b" to be mixed. Thus, if the "color b" protrudes from the "color a" due to a printing shift, the "color b" is hardly conspicuous. Further, an area of the "color a" having a high depth is large, and therefore "trapping" itself is inconspicuous.

As described above, in color separation processing according to this embodiment, deep blue of a color sample is separated into a common color and a process color. As a result, in a case where the common color and the process color are mixed, it is possible to make a printing shift inconspicuous.

In the embodiment described above, in order to prepare an ink of a common color, inks of two or more process colors are selected from among inks of four or more process colors and the inks of the two or more process colors are toned. However, preparation of the ink of the common color is not limited to this example. For example, the ink of the common color may be prepared by toning an ink of one or more standard colors. The ink of the common color may be prepared by toning an ink of a spot color and an ink of a process color. The ink of the common color may be prepared by toning inks of a plurality of spot colors. The ink of the common color may be prepared by using a spot ink toned by a maker in advance only for a specific user. Herein, the spot ink is included in a category of spot colors. That is, the common color (first color) may be obtained from an ink of one or a plurality of process colors, an ink of one or a plurality of standard colors, an ink of one or a plurality of spot colors, one or a plurality of spot inks, or combinations thereof.

According to the color separation processing method according to this embodiment, two or more process colors are selected from among process colors. An ink of the first deep blue is prepared by toning inks of the selected two or more process colors. One or a plurality of second deep blue colors is reproduced by mixing the first deep blue (common color) with one or more process colors. In a case where a color sample is indicated by a person who orders printing, the following is performed: the second deep blue corresponding to the color sample is selected from among the plurality of second deep blue colors; a common color, a color separation value of the common color, a process color, and a color separation value of the process color for reproducing the second deep blue are obtained; and printing is carried out based on the common color, the color separation value of the common color, the process color, and the color separation value of the process color.

If an ink of the second deep blue is reproduced by toning inks of two or more process colors, an excessive residual ink that is difficult to divert into reproduction of color other than the ink of the second deep blue may be generated. However, the ink of the common color can also be diverted into reproduction of color other than the ink of the second deep blue. Therefore, it is possible to reduce an excessive residual ink that is difficult to divert into reproduction of color other than the ink of the second deep blue.

Furthermore, in particular, among colors to be reproduced in gravure printing, deep blue is a color that is frequently used. When deep blue is reproduced by mixing two or more process colors, a printing shift and the like are made conspicuous, as compared to other colors. By mixing a common color and a process color in order to reproduce the second deep blue, a printing shift occurring when the second deep blue is reproduced can be made inconspicuous.

In the color separation processing method according to the above-mentioned embodiment, the ink of the first deep blue (common color) is prepared by selecting two or more process colors from among process colors and toning inks of the selected two or more process colors. Furthermore, one or a plurality of second deep blue colors is reproduced by mixing the first deep blue with one or more process colors. However, a method of preparing the first deep blue and reproducing the second deep blue is not limited to this example. For example, the following method can also be employed. Inks of two or more standard colors are selected from among inks of standard colors. The ink of the first deep blue (common color) is prepared by toning the inks of the selected two or more standard colors. One or a plurality of second deep blue colors is reproduced by mixing the first deep blue with one or more standard colors. In this case, in a case where a color sample is indicated by a person who orders printing, the following is performed: the second deep blue corresponding to the color sample is selected from among the plurality of second deep blue colors; a common color, a color separation value of the common color, a standard color, and a color separation value of the standard color for reproducing the second deep blue are obtained; and printing is carried out based on the common color, the color separation value of the common color, the standard color, and the color separation value of the standard color.

Modification Example

In the color separation processing method according to the above-mentioned embodiment, a case of deep blue has been described as an example of color of a color sample. In this modification example, a case of brown will be described as another example of color indicated by a color sample.

As a color separation processing apparatus, it is possible to apply the color separation processing apparatus 100 according to the embodiment that has been described with reference to FIG. 1. As a specified color table, it is possible to apply the specified color table 102 that has been described with reference to FIG. 2. In this modification example, brown is applied as an example of a common color. As an example of a specified color, brown obtained by mixing the common color with both or one of cyan and yellow among process colors is applied. In other words, brown (hereinafter, referred to as "first brown") is configured (selected) as the common color. Brown (hereinafter, referred to as "second brown") is configured by mixing both or one of cyan and yellow with the first brown. The process colors to be mixed with the common color are not limited to cyan and yellow and may be other process colors. Further, in order to prepare the specified color, a standard color may be mixed with the common color, instead of or in addition to the process colors.

Note that the first brown is an example of a first color. The process color and/or standard color to be mixed with the common color (first color) are examples of an added color. The second brown is an example of a second color. The second color may be a color obtained by mixing an ink of the common color (first color) with an ink of the process color and/or standard color (added color).

In a case where the common color is expressed by using the CIELAB space and a measurement value of the common color is indicated by (L4, a4, b4), a range of the first brown is L4=16 to 30, a4=24 to 39, and b4=−12 to 32 and is more preferably L4=20 to 28, a4=30 to 37, and b4=5 to 32.

Regarding operation of the color separation processing apparatus, FIGS. 3 and 4 can be applied. Regarding a printing process, the printing apparatus 300 that has been described with reference to FIG. 5 can be applied.

By carrying out printing in the printing apparatus 300 in accordance with specified color separation information, an ink of a common color and an ink of a process color are mixed, and therefore printing using brown of a color sample indicated by a person who orders printing can be carried out with respect to a printing base material.

In particular, in a case where the specified color is brown, it is possible to make a printing shift inconspicuous by mixing the common color with the process color.

In this embodiment, in printing the "brown" group, "brown", which is a versatile color among "brown" colors that are frequently used, is set as a "common color". A color difference between the common color and "brown" that is a specified color of each commodity is adjusted by appropriately mixing the "common color" and one or both of a process color and a standard color. In this case, the "common color" having a high depth is used as a base. As a result, it is possible to reduce a depth of the process color and/or standard color to be mixed. Therefore, even if "trapping" is not provided, misregister is inconspicuous.

Furthermore, in this embodiment, it is possible to carry out printing in which misregister is inconspicuous by providing the "trapping". Further, the "common color" having a high depth and the process color (and/or standard color) having a low depth are mixed, and therefore the "trapping" itself is also inconspicuous.

Specifically, a pattern of a printing plate used when an ink of the process color is transferred to a printing base material is reduced to be smaller than a pattern of a printing plate used when an ink of the common color is transferred to the printing base material. It is thus possible to further make a printing shift inconspicuous.

Figure 7A:
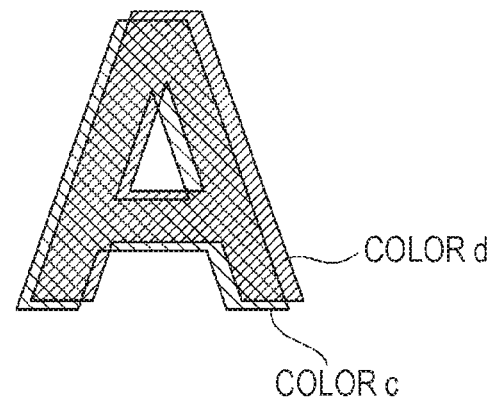
FIGS. 7A to 7C show (second) comparison results of a printing shift.
Figure 7B:
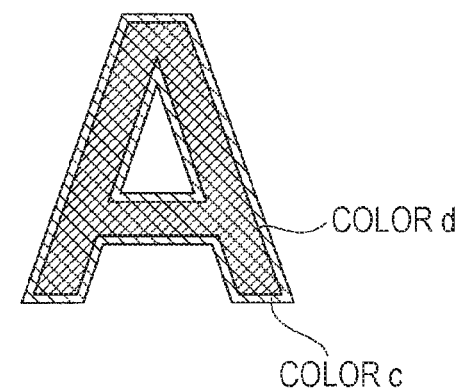
Figure 7C:
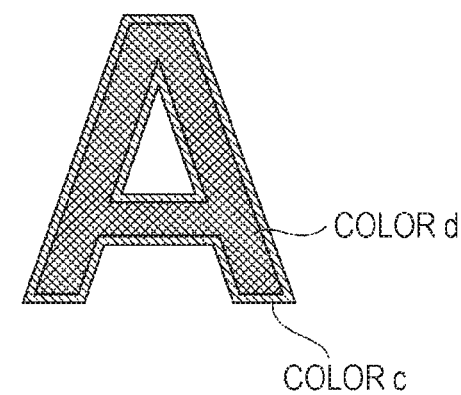

FIGS. 7A and 7B show examples of a printing result of brown prepared by mixing process colors in accordance with a conventional printing method. FIG. 7C shows an example of a printing result of brown prepared in accordance with this modification example. In a case where brown is reproduced by using process colors, brown is prepared by mixing cyan, magenta, and yellow in many cases. Moreover, in gravure printing, a printing shift between yellow that is a process color and other colors is almost inconspicuous because a depth of color of yellow is low. Further, regarding yellow, a plate is designed without providing trapping in particular in many cases because an influence on appearance can be small. Note that it is exceedingly difficult to express a printing shift among three colors of cyan, magenta, and yellow by using a drawing. Therefore, in FIGS. 7A and 7B, yellow that has a small influence on a printing shift is omitted for convenience of explanation. In other words, hereinafter, there will be described a case where two colors of cyan and magenta are mixed.

In FIGS. 7A and 7B, a "color c" is magenta, and a "color d" is cyan.

According to FIG. 7A, when a printing shift between the "color c" and the "color d" occurs, a part in which the "color c" and the "color d" are overlapped looks purple (actually looks brown because yellow is mixed). Meanwhile, a part of only the "color c" looks blurred pink. Furthermore, a part of only the "color d" looks blurred blue.

In the example shown in FIG. 7B, in order to make a printing shift inconspicuous, a figure of one color is slightly reduced. That is, so-called "trapping" is provided. The "color c" and the "color d" in FIG. 7B have a relationship of opposite colors and both are deep colors. Therefore, even in a case where "trapping" is provided in one color, the other color is made conspicuous. Specifically, it appears that a border of the "color c" is provided in the example shown in FIG. 7B, which does not look good.

In the example shown in FIG. 7C, the "color c" is set to be "brown" serving as a common color and the "color d" is set to be a process color. According to FIG. 7C, both the "brown" serving as the common color and the specified color have high depths and have close hues. Therefore, it is possible to reduce a depth of the "color d" to be mixed. Thus, if the "color d" protrudes from the "color c" due to a printing shift, the "color d" is hardly conspicuous. Further, an area of the "color c" having a high depth is large, and therefore "trapping" is inconspicuous.

As described above, in color separation processing according to this modification example, brown of a color sample is separated into a common color and a process color. Therefore, in a case where the common color and the process color are mixed, it is possible to make a printing shift inconspicuous.

In the embodiment described above, in order to prepare an ink of a common color, inks of two or more process colors are selected from among inks of four or more process colors and the inks of the two or more process colors are toned. However, preparation of the ink of the common color is not limited to this example. For example, the ink of the common color may be prepared by toning an ink of one or more standard colors. The ink of the common color may be prepared by toning an ink of a spot color and an ink of a process color. The ink of the common color may be prepared by toning inks of a plurality of spot colors. The ink of the common color may be prepared by using a spot ink.

According to the color separation processing method according to this modification example, two or more process colors are selected from among process colors. An ink of the first brown is prepared by toning inks of the selected two or more process colors. One or a plurality of second brown colors is reproduced by mixing the first brown (common color) with one or more process colors. In a case where a color sample is indicated by a person who orders printing, the following is performed: the second brown corresponding to the color sample is selected from among the plurality of second brown colors; a common color, a color separation value of the common color, a process color, and a color separation value of the process color for reproducing the second brown are obtained; and printing is carried out based on the common color, the color separation value of the common color, the process color, and the color separation value of the process color.

If an ink of the second brown is reproduced by toning inks of two or more process colors, an excessive residual ink that is difficult to divert into reproduction of color other than the ink of the second brown may be generated. However, the ink of the common color can also be diverted into reproduction of color other than the ink of the second brown. Therefore, it is possible to reduce an excessive residual ink that is difficult to divert into reproduction of color other than the ink of the second brown.

Furthermore, in particular, among colors to be reproduced in gravure printing, brown is color that is frequently used. When brown is reproduced by mixing two or more process colors, a printing shift and the like are made conspicuous, as compared to other colors. By mixing a common color and a process color in order to reproduce the second brown, a printing shift occurring when the second brown is reproduced can be made inconspicuous.

In the color separation processing method according to the above-mentioned modification example, the ink of the first brown (common color) is prepared by selecting two or more process colors from among process colors and toning inks of the selected two or more process colors. Furthermore, one or a plurality of second brown colors is reproduced by mixing the first brown with one or more process colors. However, a method of preparing the first brown and reproducing the second brown is not limited to this example. For example, the following method can also be employed. Inks of two or more standard colors are selected from among inks of standard colors. The ink of the first brown (common color) is prepared by toning the inks of the selected two or more standard colors. One or a plurality of second brown colors is reproduced by mixing the first brown with one or more standard colors. In this case, in a case where a color sample is indicated by a person who orders printing, the following is performed: the second brown corresponding to the color sample is selected from among the plurality of second brown colors; a common color, a color separation value of the common color, a standard color, and a color separation value of the standard color for reproducing the second brown are obtained; and printing is carried out based on the common color, the color separation value of the common color, the standard color, and the color separation value of the standard color.

In the above-mentioned embodiment and modification example, the specified color table is an example of a table. Further, in the above-mentioned embodiment and modification example, deep blue (first deep blue, second deep blue) and brown (first brown, second brown) are exemplified as a common color and a specified color. However, the common color and the specified color are not limited to deep blue and brown and may be arbitrary colors.

The technique of the present disclosure has been described with reference to a specific embodiment and a modification example. The embodiment and the modification example are merely examples. A person skilled in the art will understand various modification examples, correction examples, alteration examples, substitution examples, and the like. For convenience of explanation, an apparatus according to the embodiment of the present disclosure has been described with reference to a functional block diagram. Such an apparatus may be realized by hardware, software, or a combination thereof. The technique of the present disclosure is not limited to the above embodiment and modification example. Various modification examples, correction examples, alteration examples, substitution examples, and the like are encompassed in the technique of the present disclosure, without departing from the spirit of the present disclosure.

The color separation processing method and the printing method according to the embodiment of the present disclosure may be the following first to eighth color separation processing methods and the following first and second printing methods.

The first color separation processing method is a color separation processing method executed by a color separation processing apparatus and includes: a step of preparing a table including first deep blue obtained by toning two or more inks and one or a plurality of second deep blue colors obtained by mixing an ink of the first deep blue with one or more inks; a step of selecting first deep blue and second deep blue corresponding to a specified color sample from the table; a step of obtaining one or more standard colors and a color separation value of the one or more standard colors based on the selected first deep blue; and a step of obtaining one or more standard colors to be mixed with the first deep blue and a color separation value of the one or more standard colors based on the selected second deep blue.

The second color separation processing method is a color separation processing method executed by a color separation processing apparatus and includes: a step of preparing a table including first deep blue obtained by using at least one or more standard colors and one or a plurality of second deep blue colors obtained by mixing an ink of the first deep blue with an ink of one or more process colors; a step of selecting first deep blue and second deep blue corresponding to a specified color sample from the table; a step of obtaining the one or more standard colors and a color separation value of the one or more standard colors based on the selected first deep blue; and a step of obtaining the one or more process colors to be mixed with the first deep blue and a color separation value of the one or more process colors based on the selected second deep blue.

The third color separation processing method is the second color separation processing method, in which the first deep blue is obtained by using a plurality of inks of process colors, a plurality of spot color inks, a spot ink, or an ink of a process color and a spot color ink.

The fourth color separation processing method is the second or third color separation processing method, in which the second deep blue color is obtained by mixing a predetermined dot percent of the ink of the one or more process colors with the ink of the first deep blue, and, in the steps of obtaining the color separation values, dot percents of the first deep blue and the one or more process colors to be mixed with the first deep blue are obtained based on the selected first deep blue and the selected second deep blue.

In the first printing method, the ink of the first deep blue and the ink of the one or more process colors are mixed based on the first deep blue, the one or more process colors to be mixed with the first deep blue, and the color separation value of the one or more process colors obtained by any one of the second to fourth color separation processing methods.

The fifth color separation processing method is a color separation processing method executed by a color separation processing apparatus and includes: a step of preparing a table including first brown obtained by toning two or more inks and one or a plurality of second brown colors obtained by mixing an ink of the first brown with one or more inks; a step of selecting first brown and second brown corresponding to a specified color sample from the table; a step of obtaining one or more standard colors and a color separation value of the one or more standard colors based on the selected first brown; and a step of obtaining one or more standard colors to be mixed with the first brown and a color separation value of the one or more standard colors based on the selected second brown.

The sixth color separation processing method is a color separation processing method executed by a color separation processing apparatus and includes: a step of preparing a table including first brown obtained by using at least one or more standard colors and one or a plurality of second brown colors obtained by mixing an ink of the first brown with an ink of one or more process colors; a step of selecting first brown and second brown corresponding to a specified color sample from the table; a step of obtaining the one or more standard colors and a color separation value of the one or more standard colors based on the selected first brown; and a step of obtaining the one or more process colors to be mixed with the first brown and a color separation value of the one or more process colors based on the selected second brown.

The seventh color separation processing method is the sixth color separation processing method, in which the first brown is obtained by using a plurality of inks of process colors, a plurality of spot color inks, a spot ink, or an ink of a process color and a spot color ink.

The eighth color separation processing method is the sixth or seventh color separation processing method, in which the second brown color is obtained by mixing a predetermined dot percent of the ink of the one or more process colors with the ink of the first brown, and, in the steps of obtaining the color separation values, the first brown, the one or more process colors to be mixed with the first brown, and the dot percent of the one or more process colors are obtained based on the selected first brown and the selected second brown.

In the second printing method, the ink of the first brown and the ink of the one or more process colors are mixed based on the first brown, the one or more process colors to be mixed with the first brown, and the color separation value of the one or more process colors obtained by any one of the sixth to eighth color separation processing methods.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A color separation processing method for being used in a printing technique using cylinders, comprising:
preparing a plurality of tables, each of the plurality of tables including both a first color, which is a color of a single ink corresponding to each of the plurality of tables prepared, and a plurality of second colors different from the first color, each of which is respectively obtained by mixing the first color with one or more added colors, each of the adding colors being classified in accordance with a dot percentage defined for each of the added colors in each of the plurality of tables prepared, the first color included in each of the plurality of tables being different from each other;

selecting, by a specified color selector, one table, from the plurality of tables having been prepared, including the first color which is most approximate to a color sample;

selecting, by the specified color selector, one second color which is most approximate to the color sample from the plurality of second colors included in the selected table;

obtaining and outputting specified color separation information including 1) first information indicating the first color constituting the selected second color, 2) second information indicating the dot percentage of the first color constituting the selected second color, 3) third information indicating the one or more added colors constituting the selected second color and 4) fourth information indicating the dot percentage of the one or more added colors constituting the selected second color; and visibly outputting a specified color which is most approximate to the color sample in accordance with both the first color and the second color based on the first, second, third and fourth information included in the specified color separation information.

2. The color separation processing method according to claim 1, wherein
the second color is a color obtained by mixing the single ink of the first color with an ink of the added color.

3. The color separation processing method according to claim 1, wherein:
the first color is first deep blue; and
the second color is second deep blue obtained by mixing the first deep blue with the added color.

4. The color separation processing method according to claim 1, wherein:
the first color is first brown; and
the second color is second brown obtained by mixing the first brown with the added color.

5. The color separation processing method according to claim 1, wherein the selecting, by the specified color selector, one second color which is most approximate to the color sample comprises:
obtaining each of a plurality of first measurement values by measuring the first color included in each of the plurality of tables;
obtaining a second measurement value by measuring a color of the color sample;
calculating a color difference based on the each of the plurality of first measurement values and the second measurement value; and
selecting one table including the first color that minimizes the color difference from the plurality of tables.

6. The color separation processing method according to claim 1, wherein the selecting, by the specified color selector, one second color which is most approximate to the color sample comprises:
obtaining each of a plurality of third measurement values by measuring each of the plurality of second colors included in the selected table;
obtaining a second measurement value by measuring a color of the color sample;
calculating a color difference based on the each of the plurality of third measurement values and the second measurement value; and selecting one second color that minimizes the color difference from the plurality of second colors.

7. The color separation processing method according to claim 1, wherein a count of the added colors is two, each of which is defined, in each of the plurality of tables prepared, as a pair of lines arranged in a matrix-shaped form in accordance with a degree of the dot percentage of each of the added colors.

8. The color separation processing method according to claim 7, wherein each of the added color is cyan and magenta.

9. The color separation processing method according to claim 1, wherein the printing technique uses a gravure printing.

10. The color separation processing method according to claim 9, wherein the gravure printing uses a halftone gravure.

11. A printing method, comprising outputting the specified color separation information by the color separation processing method according to claim 1;
printing the single ink of the first color on a printing base material based on the outputted specific color separation information; and
overprinting an ink of the added color on the printing base material on which the ink of the first color is printed, based on the outputted specific color separation information.

12. A color separation processing apparatus, comprising:
a storage storing a plurality of tables, each of the plurality of tables including both a first color, which is a color of a single ink corresponding to each of the plurality of tables prepared, and a plurality of second colors different from the first color, each of which is respectively obtained by mixing the first color with one or more added colors, the each of the one or more added colors being classified in accordance with a dot percentage defined for each of the added colors in each of the plurality of tables prepared, the first color included in each of the plurality of tables being different from each other; and
a specified color selector configured to select one table including the first color which is most approximate to a color sample from the plurality of tables stored in the storage, select one second color which is most approximate to the color sample from the plurality of second colors included in the selected table, and obtain specified color separation information including 1) first information indicating the first color constituting the selected second color, 2) second information indicating the dot percentage of the first color constituting the selected second color, 3) third information indicating the one or more added color constituting the selected second color and 4) fourth information indicating the dot percentage of the one or more added colors constituting the selected second color.

13. The color separation processing apparatus according to claim 12, wherein the specified color selector obtains each of a plurality of first measurement values by measuring the first color included in each of the plurality of tables, obtains a second measurement value by measuring a color of the color sample, calculates a color difference based on the each of the plurality of first measurement values and the second measurement value, and selects one table including the first color that minimizes the color difference from the plurality of tables.

14. The color separation processing apparatus according to claim 12, wherein the specified color selector obtains each of a plurality of third measurement values by measuring each of the plurality of second colors included in the selected table, obtains a second measurement value by measuring a color of the color sample, calculates a color difference based on the each of the plurality of third measurement values and the second measurement value, and selects one second color that minimizes the color difference from the plurality of second colors.

15. A printing method, comprising:
preparing a plurality of tables, each of the plurality of tables including both a first color, which is a color of a single first ink corresponding to each of the plurality of tables prepared, and a plurality of second colors different from the first color, each of which is respectively obtained by mixing the first color with one or more added colors, each of the added colors being classified in accordance with a dot percentage defined for each of the added colors in each of the plurality of tables prepared, the first color included in each of the plurality of tables being different from each other;
selecting, by a specified color selector, one table, from the plurality of tables having been prepared, including the first color which is most approximate to a color sample;
selecting, by the specified color selector, one second color which is most approximate to the color sample from the plurality of second colors included in the selected table;
obtaining and outputting specified color separation information including 1) first information indicating the first color constituting the selected second color, 2) second information indicating the dot percentage of the first color constituting the selected second color, 3) third information indicating the one or more added colors constituting the selected second color and 4) fourth information indicating the dot percentage of the one or more added colors constituting the selected second color;
providing the single first ink of the first color constituting the selected second color to a printing apparatus including a cylinder;
providing one or more second inks of the one or more added colors constituting the selected second color to the printing apparatus; and
printing, by the printing apparatus, a specified color in accordance with the color sample with respect to a printing base material by printing the single first ink on the printing base material based on the first and second information included in the specified color separation information and overprinting the one or more second inks on the printing base material on which the single first ink is printed, based on the third and fourth information included in the specified color separation information.

16. The printing method according to claim 15, further comprising obtaining the first single ink by toning inks of two or more colors.

17. The printing method according to claim 15, further comprising obtaining the first single ink by toning at least one or more inks of standard colors.

18. The printing method according to claim 15, further comprising obtaining the first single ink by toning one or a plurality of inks of process colors, one or a plurality of inks of standard colors, one or a plurality of spot color inks, one or a plurality of spot inks, or combinations of those inks.

19. The printing method according to claim 15, wherein the specified color is most approximate to a color of the color sample.

* * * * *